Oct. 18, 1932.  R. CROSS  1,883,593
ANTIKNOCK COMPOUNDS FOR INTERNAL COMBUSTION
ENGINES AND PROCESS OF MAKING SAME
Original Filed Dec. 1, 1924

Plain motor fuel

3½% + Aniline 0.1% + Cyanamide

3% + Carbon tetrachloride.

Witness:
R. Hamilton

INVENTOR.
Roy Cross
BY Thomas E. Scofield
ATTORNEY.

Patented Oct. 18, 1932

1,883,593

UNITED STATES PATENT OFFICE

ROY CROSS, OF KANSAS CITY, MISSOURI

ANTIKNOCK COMPOUNDS FOR INTERNAL COMBUSTION ENGINES AND PROCESS OF MAKING SAME

Application filed December 1, 1924, Serial No. 753,069. Renewed January 25, 1932.

This invention relates to improvements in anti-knock compounds or "anti-pinking" compounds to be mixed with motor fuel to prevent and eliminate the so-called knock from gasoline engines. This factor in the operation of gasoline engines is especially prevalent when the motor is working under a heavy load with an advanced spark. Considerable work has been done upon the elimination of this objectionable feature of internal combustion engines, and it has been found that the addition of certain compounds of minerals soluble in the motor fuel will retard the knocking in the motor.

It has been found that certain organic compounds free from mineral matter and halogens and containing from 20% to 80% nitrogen have a very effective retarding action on the force of the explosion if combined and mixed with the explosive gas or mixture of hydrocarbon and air used as fuel. Generally, it may be said that the greater the amount of nitrogen and carbon present, the more valuable the anti-knock properties; or, in other words, the smaller the amount of hydrogen the more valuable the anti-knock property.

The most valuable specific compounds for this purpose are

Cyanamide _____ $(CN-NH_2)$
Dicyandiamide _____ $(CN-NH_2)_2$
Cyanoform _____ $CH(CN)_3$
Urea _____ $CO(NH_2)_2$
Cyan-anilid _____ $CN-NH-C_6H_5$
Cyanic acid _____ $CONH$
Ammonia _____ $NH_3$
Hydrazine _____ $N_2H_4$ The most valuable of these compounds is cyanamide because of its exceptional anti-detonating effect, its high percentage of nitrogen, its distillation temperature and its solubility in ether and hydrocarbon oils. The dicyandiamide is equally effective, but is very difficult to incorporate with motor fuels as it is practically insoluble in ether and is only soluble in alcohol to the extent of substantially 1.25%. Anhydrous ammonia $NH_3$ used in conjunction with dicyandiamide in some instances has given very satisfactory results,—the ammonia, in addition to the dicyandiamide, having certain anti-knock properties when mixed with the gasoline.

When using cyanamide, the amount necessary to give the desired results, will vary according to the character and detonating proclivities of the oil treated. Amounts varying from 0.1% to 1.0%, depending upon the fuel, have been effectively used. The particular value of this class of compounds, in addition to their anti-detonating properties, lies in their cheapness and the fact that they do not contain any metallic or mineral substances and that they do not produce any poisonous substances in the engine exhaust or cause injury to the metal parts. In addition to this, dicyandiamide is, at the present time, produced on a large scale and in large quantities without danger to those engaged in its manufacture. The substance from which cyanamide is obtained is usually calcium cyanamide which, at the present time, has a value of about 3¢ per pound.

The effect of anti-knock substances can be readily determined by mounting a gasoline engine upon a block and fitting thereto a suitable indicator card registering the character of the explosion by means of a curve which shows upon the indicator card the operation of the motor on the various fuel mixtures which are used.

Figure 1:
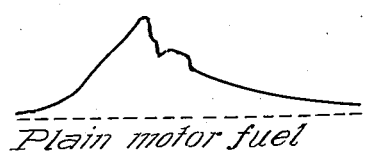
Fig. 1 shows the operation of the motor upon gasoline marketed at a nearby filling station and is characteristic of the present day motor fuel. The sharp angular curves coming to a decided peak, shows the presence of engine knock or pinging.
Figure 2:
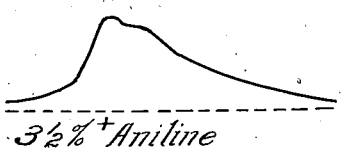
Fig. 2 shows a curve made upon the indicator card when using the above motor fuel with an addition of 3½% of aniline. This curve demonstrates the softening effect or anti-knock properties of this material, as the curve is obviously much smoother than the former.
Figure 3:
Fig. 3 shows a curve made with the same fuel with the addition of 0.1% of cyanamide. The curve is noticeably smoother than either of the foregoing, and brings out the effectiveness of this material as an anti-detonating compound.
Figure 4:
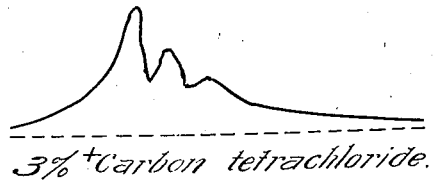
Fig. 4 shows a curve made with the addition of 3% of carbon tetrachloride. In this case the knocking properties are even more pronounced than in the curve shown in Fig. 1.

In each case, the curve was registered on the indicator card when the motor operation was substantially identical as to load and timing of the spark.

A suitable method of preparing anti-knock motor fuel from the compounds mentioned is to make a concentrated solution of cyanamide, cyanoform, cyan-anilid, aniline, urea or other nitrogenous compounds, in ether, benzol, gasoline or similar solvent. This concentrated solution is then added to the gasoline in the necessary quantity to attain the desired effect. As mentioned, certain motor fuels require more anti-detonating material than others. For example, the California oils are notoriously anti-detonating in their effect, as is benzol and other fuels. On the other hand, certain oils from particular wells have the characteristic of knocking very easily when used as a motor fuel and must be mixed with a compound of this character,—especially when used in an engine having high compression or one fouled with carbon deposition.

From the curve shown in the drawing, it will be noted that cyanamide and aniline seem to have the strongest anti-detonating properties. The effectiveness of cyanamide is probably due, in part, to the fact that it has a very low heat of combustion. This slowing of the explosion allows the fuel to be burned a little more completely and reduces the amount of carbon monoxide discharged through the exhaust. By this consumption or conversion of carbon monoxide to carbon dioxide, more power is obtained, and by the slowing of the explosion, the carbon knock is eliminated.

A further advantage of cyanamide, and some of the nitrogenous compounds mentioned, is that they volatilize at a temperature below the endpoint and approximating the average distillation temperature of ordinary motor fuel or gasoline. Thus, there is no deposition or accumulation of objectionable carbon in the engine cylinders. They also normally have a considerable vapor tension at ordinary temperature.

The percentage of nitrogenous compounds, as specified in the claim, is shown or approximated by the chemical formulæ.

I claim as my invention:

A hydrocarbon motor fuel for internal combustion engines containing dissolved cyanoform.

ROY CROSS.